United States Patent [19]
Adachi

[11] Patent Number: 5,153,513
[45] Date of Patent: Oct. 6, 1992

[54] APPARATUS FOR PROCESSING OUTPUT SIGNAL OF SENSOR WITH MAGNETIC ROTARY MEMBER

[75] Inventor: Tsuneo Adachi, Higashimatsuyama, Japan

[73] Assignee: Zexel Corporation, Tokyo, Japan

[21] Appl. No.: 704,305

[22] Filed: May 22, 1991

[30] Foreign Application Priority Data

May 25, 1990 [JP] Japan ............................... 2-54953[U]
Nov. 30, 1990 [JP] Japan .................................. 2-333695

[51] Int. Cl.$^5$ .......................... G01B 7/14; G01P 3/48; G01P 3/54
[52] U.S. Cl. .......................... 324/207.25; 324/207.11; 324/207.12; 324/174
[58] Field of Search ...................... 324/207.11, 207.12, 324/207.2, 207.22, 207.25, 166, 173, 174

[56] References Cited

U.S. PATENT DOCUMENTS 4,922,757  5/1990  Rozelle et al. ...................... 324/173

FOREIGN PATENT DOCUMENTS 63-29713  2/1988  Japan .

Primary Examiner—Walter E. Snow
Attorney, Agent, or Firm—Pollock, Vande Sande & Priddy

[57] ABSTRACT

In an apparatus for processing an output signal of a rotation sensor having a magnetic-electric transducer and the associated magnetic rotary member, a first level discriminator responsive to the output signal produces a first signal whose level changes at a detection time the transducer relatively comes opposite a predetermined position of the rotary member, and a second level discriminator responsive to the output signal produces a second signal whose level changes at a time different from the detection time. In order to obtain a pulse carrying information on the detection time, the first and second signals are input to a logic circuit, by which the pulse is produced in response to the change in the level of the first signal only in the case where the level of the second signal is in a prescribed state when the level of the first signal changes at the detection time, whereby the desired detection time can be precisely determined.

6 Claims, 4 Drawing Sheets

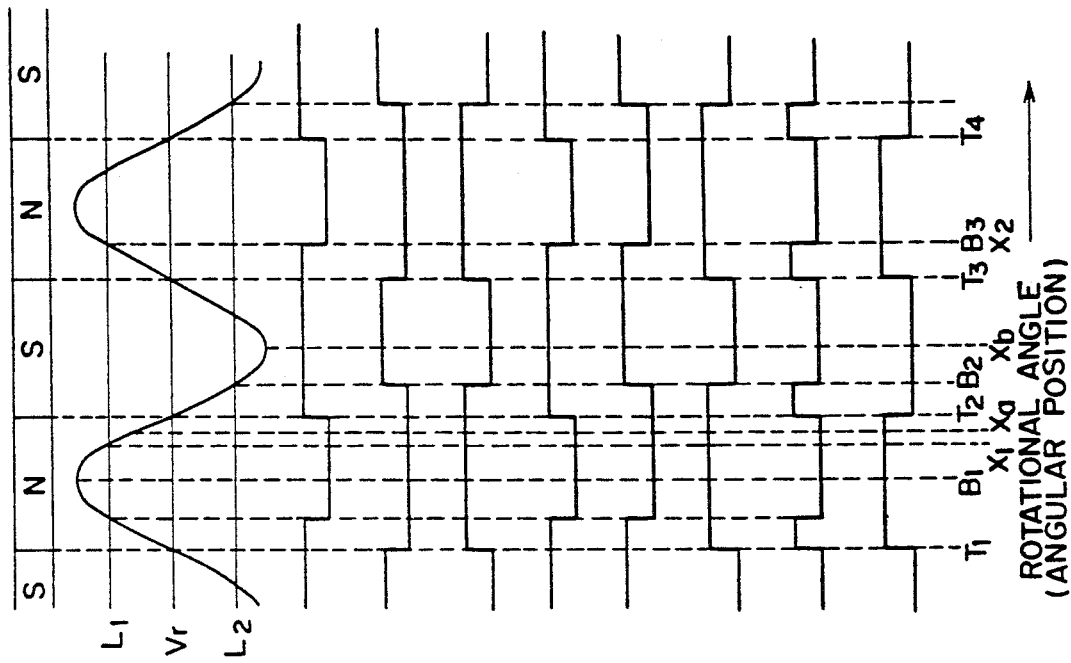
FIG.4A MAGNETIC POLES OF ROTARY DISK
FIG.4B AMPLIFIED OUTPUT SIGNAL S
FIG.4C OUTPUT VOLTAGE $V_{11}$
FIG.4D OUTPUT VOLTAGE $V_{21}$
FIG.4E SET SIGNAL SS
FIG.4F RESET SIGNAL RS
FIG.4G Q OUTPUT SIGNAL FS
FIG.4H INVERTED VOLTAGE $IV_{21}$
FIG.4I CLOCK SIGNAL K
FIG.4J DETECTION SIGNAL OS

APPARATUS FOR PROCESSING OUTPUT SIGNAL OF SENSOR WITH MAGNETIC ROTARY MEMBER

BACKGROUND OF THE INVENTION

1. Field of the invention

The present invention relates to a signal processing processing apparatus for rotation sensors for outputting a signal representing information concerning the rotational condition of a member being detected by the use of a magnetic-electric transducing element.

2. Description of the prior art

For use in detecting the rotational speed of an internal combustion engine, Japanese Utility Model Application Public Disclosure No. 29713/88 discloses a signal generator having a magnetic rotary member having N poles and S poles alternately provided on its periphery in an annular form and a magnetic-electric transducing element for producing an electric signal corresponding to changes in the magnetic field caused by the rotation of the magnetic rotary member. In the disclosed signal generator, part of the output signal obtained from the transducing element is inverted in phase to obtain two signals different only in a phase, the level of each signal is discriminated by a corresponding level comparing circuit with hysteresis characteristics, and the time that the magnetic rotary member moves relative to the transducing element such that the transducing element moves relatively from a position facing N or S pole of the magnetic rotary member to a position facing S or N pole thereof is detected by processing of the output signals of the level comparing circuits.

The disclosed signal generator requires an inverting amplifying circuit for obtaining two signals different only in being separated in phase by 180 degrees. Thus, if the adjusted offset of the inverting amplifying circuit should shift from the desired condition, the signal generator will no longer be able to produce a signal properly representing the rotational condition of the magnetic rotary member. Furthermore, since the proposed signal generator is arranged to generate a set of pulse signals alternating in polarity, it will be difficult to remove noise components from these pulse signals when the pulse width of the individual pulse signals is shortened due to increase in the rotational speed of the magnetic rotary member, making it impossible to use the signal at a remote point. Still further, it is difficult to determine the exact rotational position of the magnetic rotary member when it is subject to vibration of a relatively small angular amplitude during rotation.

SUMMARY OF THE INVENTION

It is an object of the present invention to provide an improved signal processing apparatus for rotation sensors using a magnetic-electric transducing element.

It is another object of the present invention to provide a signal processing apparatus for processing the output signal of a rotation sensor, which is capable of obtaining an electric signal indicating the rotational information of a member being detected with little effect from noise components in the output signal.

It is a further object of the present invention to provide a signal processing apparatus for rotation sensors, which is capable of obtaining an electric signal indicating the rotational information of a member being detected with little effect from undesired components in the output signal of the rotation sensor.

According to the present invention, in a signal processing apparatus for processing the output signal of a rotation sensor having a rotary member with a magnetic pole or poles of one type and a magnetic pole or poles of the other type arranged alternately, and a tranducing means for obtaining an electric signal whose level changes in accordance with the change in the magnetic field produced by the relative movement between the rotary member and the transducing means, the signal processing apparatus comprises a first circuit responsive to the output signal for producing a first signal whose level changes at a detection time when, for example, the relative positional relationship between the transducing means and the rotary member changes form the condition where the transducing means faces the one type of magnetic pole to the condition where the transducing means faces the other type of magnetic pole, and a second circuit responsive to the output signal for producing a second signal whose level changes at a time different from the detection time. The first and second signals are input to a logic circuit means, by which a pulse signal indicating the detection time is produced in response to the change in the level of the first signal only in the case where the level of the second signal is in a prescribed state when the level of the first signal changes at the detection time.

In the preferred embodiments, the rotation sensor is used for detecting the rotational speed of, for example, an internal combustion engine, and produces the output signal whose level changes in response to the changes in the magnetic field applied to the transducing means owing to the relative movement between the transducing means and the rotary member. The level of the output signal is discriminated by the first circuit to produce the first signal whose level changes from one state to the other state at least at the detection time when the transducing means relatively moves from the territory of one type of magnetic pole to that of the other type of magnetic pole.

On the other hand, the level of the output signal is discriminated by the second circuit to produce the second signal whose level state changes at a time different from the detection time. Hysteresis characteristics may be utilized for this level discriminating operation.

The logic circuit means is responsive to the first and second signals to produce a pulse signal showing the detection time if the level of the second signal is at the prescribed level when the level of the first signal changes from one level state to the other level state. Thus, the desired detection time can be precisely determined without need for an inverting amplifier.

The invention will be better understood and other objects and advantages thereof will be more apparent from the following detailed description of preferred embodiments with reference to the accompanying drawings.

BRIEF DESCRIPTION OF THE DRAWINGS

FIG. 4A is a diagram showing the arrangement of magnetic poles of a magnetic rotary disk of FIG. 3, which is illustrated in a linearly expanded form; and FIGS. 4B to 4J are waveforms of the signals appearing in the signal processing apparatus of FIG. 3, shown in correspondence with FIG. 4A.

DESCRIPTION OF THE PREFERRED EMBODIMENTS

Figure 1:
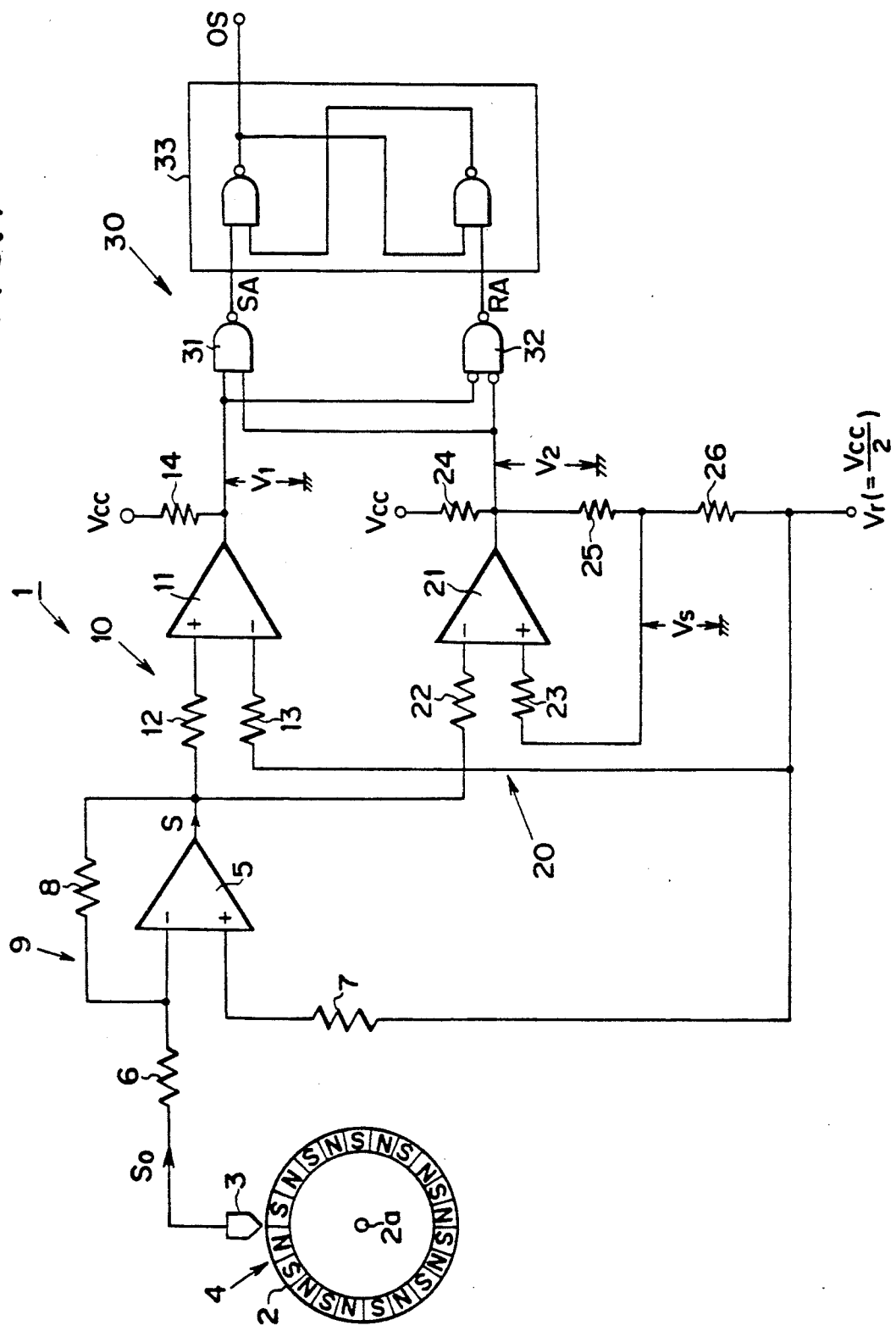
FIG. 1 is a schematic diagram of an embodiment of a signal processing apparatus according to the present invention.

FIG. 1 is a schematic diagram of an embodiment of a signal processing apparatus according to the present invention. The signal processing apparatus 1 is for processing an output signal So generated by a rotation sensor 4 of well-known design having a magnetic rotary disk 2 and a transducer 3 for transducing magnetic field intensity to a corresponding electric signal. The magnetic rotary disk 2 is provided with a plurality of N poles and a plurality of S poles arranged alternately on its outer periphery by, for example, a magnetizing process or the like. The magnetic rotary disk 2 is connected with an output shaft 2a of, for example, an internal combustion engine to rotate therewith, whereby the transducer 3 disposed near the magnetic rotary disk 2 is exposed to a magnetic field whose magnitude and direction change with the rotation of the magnetic rotary disk 2.

Figure 2:
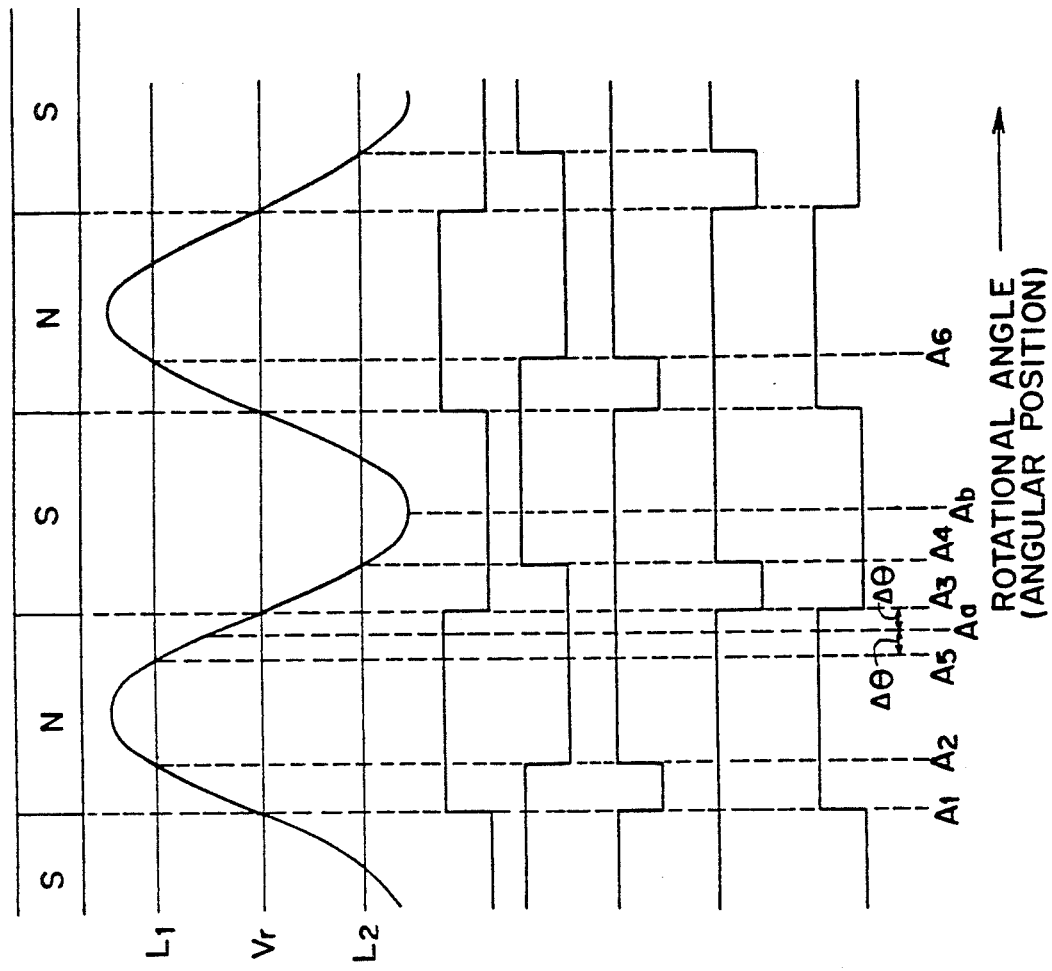
FIG. 2A is a diagram showing the arrangement of magnetic poles of a magnetic rotary disk of FIG. 1 in a linearly expanded form.
FIGS. 2B to 2G are waveforms of the signals in the signal processing apparatus of FIG. 1, shown in correspondence with FIG. 2A.

FIG. 2A illustrates the arrangement of the magnetic poles of the magnetic rotary disk 2 in a linearly expanded form. The level of the signal So output by the transducer 3 depends upon the relative movement between the transducer 3 and the magnetic rotary disk 3. Specifically, the rotation of the magnetic rotary disk 2 causes the transducer 3 to produce a sinusoidal output signal So, as is well known in the art.

The rotation sensor for obtaining the output signal So corresponding to the signal shown in FIG. 2B is not limited to one arranged in the manner of the rotation sensor 4 of FIG. 1. Alternatively, it may be arranged such that the teeth of a magnetic gear member sequentially come opposite a hall element provided on the surface of a permanent magnet member so as to cause the fall element to produce a sinusoidal output signal.

The output signal So is amplified into an amplified output signal S by an amplifying circuit 9 composed of an operational amplifier 5 and resistors 6 to 8. A first reference voltage Vr, the level of which is equal to half the level of a source voltage Vcc, is applied through the resistor 7 to the non-inverting input terminal of the operational amplifier 5. As a result, as shown in FIG. 2B, the level of the amplified output signal S is higher than that of the first reference voltage Vr when the transducer 3 faces an N pole, while the level of the amplified output signal S is lower than that of the first reference voltage Vr when the transducer 3 faces an S pole.

For discriminating the level of the amplified output signal S, a first comparing circuit 10 and a second comparing circuit 20 are provided on the output side of the amplifying circuit 9.

The first comparing circuit 10 has a comparator 11. The first reference voltage Vr is applied through a resistor 13 to the inverting input terminal of the comparator 11 and the amplified output signal S is applied through a resistor 12 to the non-inverting input terminal thereof. Therefore, the level of a first output voltage $V_1$, which is the output voltage of the first comparing circuit 10, is high when the level of the amplified output signal S is higher than that of the first reference voltage Vr and is low when the level of the amplified output signal S is lower than that of the first reference voltage Vr (FIGS. 2B and 2C). Thus, the level of the first output voltage $V_1$ changes from one state to the other state at the time the transducer 3 moves relative to the disk 2 from a position opposite to one type of magnetic pole to a position opposite to the other type of magnetic pole (FIGS. 2A and 2C).

The second comparing circuit 20 has a comparator 21 with an inverting input terminal to which the amplified output signal S is applied through a resistor 22. One end of a resistor 25 is connected to the output terminal of the comparator 21 and the first reference voltage Vr is applied through a resistor 26 to the other end of the resistor 25. A second reference voltage Vs, which appears at the junction between the resistors 25 and 26 and whose level depends upon the first reference voltage Vr and the output voltage of the comparator 21, is applied through a resistor 23 to the non-inverting input terminal of the comparator 21. The level of the second reference voltage Vs is set so as to become $L_1$, which is higher than that of the first reference voltage Vr, when the output voltage of the comparator 21 is high, and to become $L_2$, which is lower than the level of the first reference voltage Vr, when the output voltage of the comparator 21 is low (FIG. 2B).

Accordingly, it follows that the second comparing circuit 20 produces a second output voltage $V_2$ as shown in FIG. 2D in response to the amplified output signal S shown in FIG. 2B.

As will be understood from FIGS. 2B and 2D, in this embodiment, the level of the second output voltage $V_2$ is high at the time the level of the first output voltage $V_1$ changes from low to high, and is low at the time the level of the first output voltage $V_1$ changes from high to low.

For discriminating whether or not the level of the second output voltage $V_2$ assumes the state expected in advance when the level of the first output voltage $V_1$ changes, the first and second output voltages $V_1$ and $V_2$ are input to a logic circuit 30 composed of gate circuits 31 and 32, and an R-S flip-flop 33 of well-known design.

The gate circuit 31 is responsive to the first and second output voltages $V_1$ and $V_2$ to produce a set pulse signal SA, the trailing edge of which corresponds to the time when the transducer 3 moves relatively from a position opposite an S pole to a position opposite an N pole (FIG. 2E). On the other hand, the gate circuit 32 is also responsive to the first and second output signals $V_1$ and $V_2$ to produce a reset pulse signal RA, the trailing edge of which corresponds to the time when the transducer 3 moves relatively from a position opposite an N pole to a position opposite an S pole (FIG. 2F).

The R-S flip-flop 33 is reset in response to each trailing edge of the reset pulse signal RA and is set in response to each trailing edge of the set pulse signal SA. Consequently, as shown in FIG. 2G, the level of a detection signal OS, which is the output signal of the R-S flop-flop 33, changes from low to high at each trailing edge of the pulses of the set pulse signal SA and changes from high to low at each trailing edge of the pulses of the reset pulse signal RA.

The operation of the signal processing apparatus 1 of FIG. 1 will now be described with reference to FIGS. 2A to 2G.

In the case where relative movement occurs between the transducer 3 and the magnetic rotary disk 2, which has a plurality of magnetic poles shown in FIG. 2A in the expanded form, owing to the rotation of the magnetic rotary disk 2, an amplified output signal S shown in FIG. 2B is obtained from the amplifying circuit 9. The amplified output signal S is compared in level with the first reference voltage Vr by the first comparing circuit 10, which has no hysteresis characteristics. The level of the first output voltage $V_1$ changes from low to high at the time the level of the amplified output signal S exceeds that of the first reference voltage Vr at the rotational angle $A_1$. Since the level of the second output voltage $V_2$ is high at this time, the level of the second reference voltage Vs has become $L_1$, so that the high level state of the second output voltage $V_2$ is maintained at the rotational angle $A_1$. When the level of the amplified output signal S exceeds the level $L_1$ at the rotational angle $A_2$, the second output voltage $V_2$ of the second comparing circuit 20 is inverted to the low level state.

Furthermore, the low level state of the first output voltage $V_1$ is established when the level of the amplified output signal S becomes lower than that of the first reference voltage Vr at the rotational angle or angular position $A_3$. However, since the level of the second reference voltage Vs has become $L_2$ due to the establishment of the low level state of the second output voltage $V_2$ of the second comparing circuit 20 at the angular position $A_2$, the level of the second output voltage $V_2$ does not change from low to high at angular position $A_3$. The level of the amplified output signal S further lowers as the rotation of the disk 2 continues and the level of the second output voltage $V_2$ becomes high when the level of the amplified output signal S has become lower than $L_2$ at the angular position $A_4$. After this, the levels of the first and second output voltages $V_1$ and $V_2$ change depending upon the level changes of the amplified output signal S in a similar way.

As will be understood from the foregoing description, according to the circuit arrangement of the embodiment shown in FIG. 1, the level of the first output voltage $V_1$ changes when the transducer 3 moves relatively between a position opposite one type of magnetic pole and a position opposite the other type of magnetic pole. On the other hand, the second output voltage $V_2$ obtained by the second comparing circuit 20 is a pulse signal whose phase is different from that of the first output voltage $V_1$ produced by the first comparing circuit 10. As a result, the level of the second output voltage $V_2$ is high at each leading edge of the first output voltage $V_1$ and is low at each trailing edge of the first output voltage $V_1$.

The logic circuit 30 serves to discriminate whether or not a prescribed relationship in level is established between the first output voltage $V_1$ and the second output voltage $V_2$, and the detection signal OS, whose level changes in accordance with the level change of the first output voltage $V_1$, is produced when the prescribed relationship therebetween has been established (FIGS. 2C and 2G).

As a result, the duty cycle of the detection signal OS depends only upon the width of the magnetic poles provided on the magnetic rotary disk 2, so that the duty cycle does not change even if the level of the amplified output signal S varies, whereby stable operation can be realized. Furthermore, even if chattering occurs on the output side of the first comparing circuit 10 due to, for example, the superposition of a noise signal on the amplified output signal S when the output level of the first comparing circuit 10 is changed, the chattering is prevented from causing any problem by the operation of the R-S flip-flop 33.

Furthermore, the level of the first output voltage $V_1$ may be changed by a noise component appearing on the output of the amplifying circuit 9 even when the magnetic rotary member 2 is not rotating. However, since the level of the second reference voltage Vs is $L_1$ or $L_2$, which is higher or lower than the level of the first reference voltage Vr because of the hysteresis characteristic of the second comparing circuit 20, the level of the detection signal OS is not changed in response to the noise component so long as the amplitude of the noise component is smaller than a predetermined level, whereby the effect of the noise component can be eliminated.

In addition, in the case where the magnetic rotary disk 2 vibrates slightly within an angular range from $+\Delta\theta$ to $-\Delta\theta$ of the angular position $\theta_o$ as center, if Aa $- A_5 > \Delta\theta$ and $A_3 -$ Aa $> \Delta\theta$ under the condition that $\theta_o$ is equal to Aa, this vibration of the magnetic rotary disk 2 does not affect the signal processing operation. In the case where $\theta_o$ is equal to Ab, the vibration of the disk 2 does not affect the signal processing operation so long as $\Delta\theta <$ Ab $- A_5$ and $\Delta\theta < A_6 -$ Ab.

Although the embodiment shown in FIG. 1 employs the first comparing circuit 10 with no hysteresis characteristics and the second comparing circuit 20 with hysteresis characteristics to process the amplified output signal S, the present invention is not limited to this constitution, and a zero-crossing type comparator with hysteresis characteristics can be used instead. In this case, a signal processing circuit having the same function as that of the signal processing circuit 1 of FIG. 1 can be realized by the use of two zero-crossing type comparators with hysteresis characteristics in such a way that the zero-crossing level (Vr) and the level $L_1$ are selected as reference levels for one comparator and the zero-crossing level (Vr) and the level $L_2$ are selected as reference levels for the other comparator.

Figure 3:
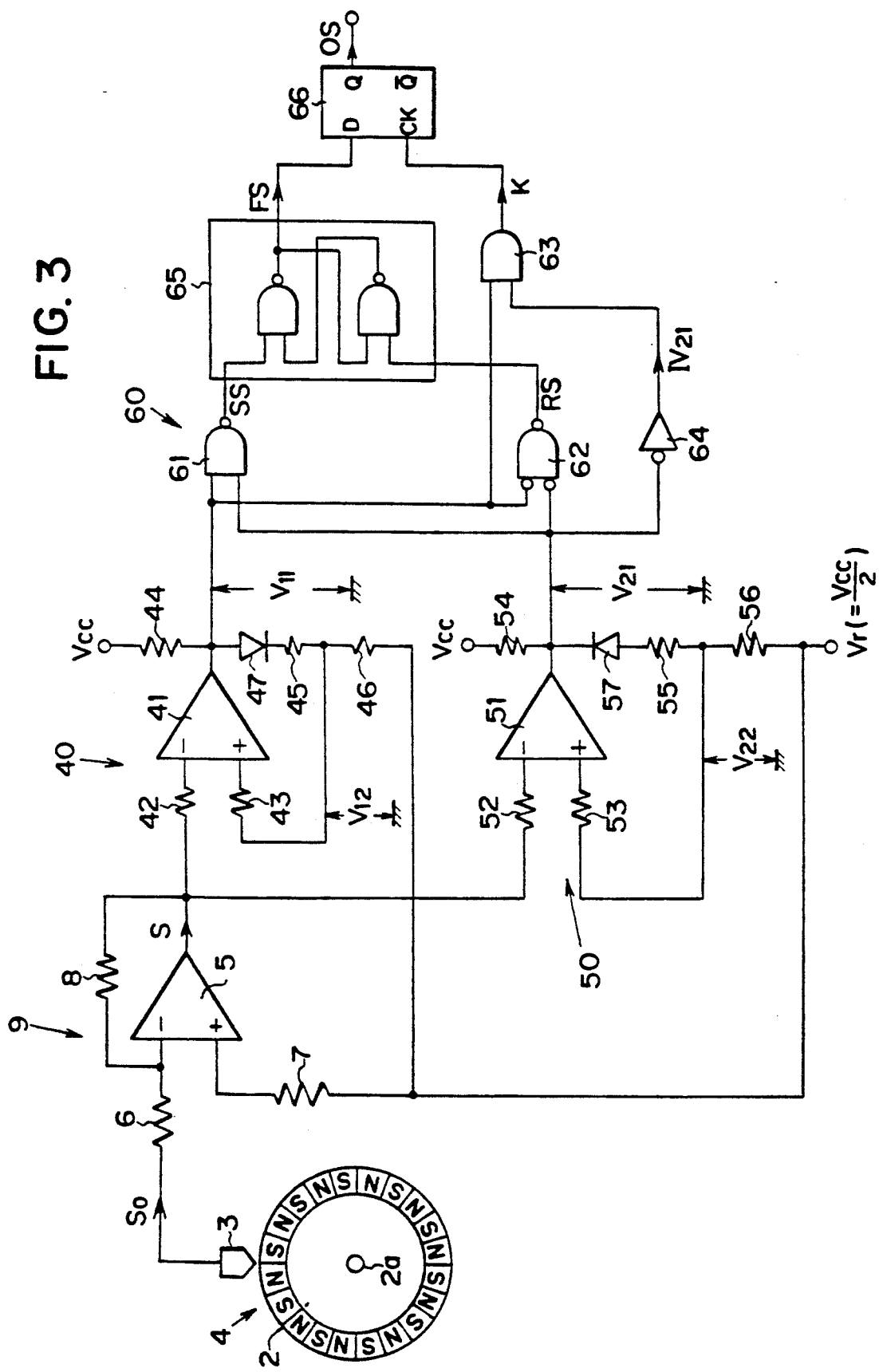
FIG. 3 is a schematic diagram of another embodiment of a signal processing apparatus according to the present invention.

FIG. 3 shows another embodiment of a signal processing apparatus of the present invention, which is arranged by the use of zero-crossing type comparing circuits with hysteresis characteristics. In the signal processing apparatus 100 shown in FIG. 3, each portion corresponding to a portion of the signal processing apparatus 1 of FIG. 1 is designated by the same reference numeral, and will not be described further here.

For discriminating the level of the amplified output signal S, the signal processing apparatus 100 of FIG. 3 comprises a first level discriminating circuit 40 and a second level discriminating circuit 50.

The first level discriminating circuit 40 is arranged as a zero-crossing type comparator with hysteresis characteristics and is of well-known design. Specifically, a source voltage Vcc is applied through a resistor 44 to the output terminal of a comparator 41 and the first reference voltage Vr is applied thereto through resistors 45 and 46 and a diode 47. The voltage $V_{12}$ appearing at the junction between the resistors 45 and 46 is applied through a resistor 43 to the non-inverting input terminal of the comparator 41. On the other hand, the amplified output signal S is applied through a resistor 42 to the inverting input terminal of the comparator 41.

Accordingly, in the case where the output level of the comparator 41 is sufficiently low because, for example, the level of the amplified output signal S is higher than Vr, the diode 47 is biased in backward, so that the level at the non-inverting input terminal of the comparator 41 is substantially equal to Vr. Thus, the level of the output voltage $V_{11}$ of the first level discriminating circuit 40 changes from low to high at the time the level of the amplified output signal S becomes lower than Vr.

When the level of the output voltage $V_{11}$ is high the diode 47 is biased forward, so that the level at the non-inverting input terminal of the comparator 41 becomes a prescribed level $L_1$ higher than Vr (FIG. 4B). Consequently, even if the level at the inverting input terminal of the comparator 41 becomes slightly higher than Vr due to noise, the output level of the comparator 41 does not change from high to low in response to such noise. As a result, even if noise is superposed on the amplified output signal S, it is possible to effectively prevent chattering from occurring at the output of the comparator 41 at the time of the changeover of the output level.

As will be understood from the foregoing description, the level of the voltage $V_{12}$ which is applied to the non-inverting input terminal of the comparator 41 varies depending upon the output level of the comparator 41, whereby hysteresis characteristics are realized in the comparing operation of the comparator 41. Thus, it follows that the level of the output voltage $V_{11}$ varies as illustrated in FIG. 4C.

According to the circuit constitution of FIG. 3, the level of the output voltage $V_{11}$ changes from low to high at the time the transducer 3 moves relatively from a position opposite an N pole to a position opposite an S pole, that is, at $T_2$, $T_4$, .. (FIGS. 4A and 4C).

The second level discriminating circuit 50 is also a zero-crossing type comparator with hysteresis characteristics and is constituted according to a well-known design by the use of a comparator 51, resistors 52 to 56 and a diode 57 in a manner similar to the first level discriminating circuit 40, except that the direction of the diode 57 is reversed.

Description will now be given to the operation of the second level discriminating circuit 50.

In the case where the level of the amplified output signal S is sufficiently lower than Vr, a high output level condition is established in the comparator 51. In this case, the level at the non-inverting input terminal of the comparator 51 is substantially equal to Vr because of the backward biasing of the diode 57. As a result, the level of the output voltage $V_{21}$ of the second level discriminating circuit 50 changes from high to low when the level of the amplified output signal S exceeds the level of the reference voltage Vr.

This causes the diode 57 to be forwardly biased and the level at the non-inverting input terminal of the comparator 51 becomes a level $L_2$ lower than Vr (FIG. 4B). As a result even if the level at the inverting input terminal of the comparator 51 becomes slightly smaller than Vr due to noise, the output level of the comparator 51 does not change from low to high in response to such noise. As a result, even if noise is superposed on the amplified output signal S, it is possible to effectively prevent chattering from occurring at the output of the comparator 51 at the time of the changeover of the output level.

When the level of the amplified output signal S is lower than the level $L_2$, which is the level at the non-inverting input terminal of the comparator 51 at that time, the output level of the comparator 51 becomes high again, whereby the level at the non-inverting input terminal becomes equal to Vr again.

As will be understood from the foregoing description, the level of the output voltage $V_{22}$, which is applied to the non-inverting input terminal of the comparator 51, varies depending upon the output level of the comparator 51, whereby hysteresis characteristics are realized in the comparing operation of the comparator 51. Thus, it follows that the level of the output voltage $V_{21}$ varies as illustrated in FIG. 4D. According to the circuit constitution of FIG. 3, the level of the output voltage $V_{21}$ changes from high to low at the time the transducer 3 moves relatively from a position opposite an S pole to a position opposite an N pole, that is, at $T_1$, $T_3$,.... (FIGS. 4A and 4D).

As will be understood from comparing FIG. 4C with FIG. 4D, in the embodiment shown in FIG. 3, the level of the output voltage $V_{21}$ is low at the time of the leading edge of the output voltage $V_{11}$ and is high at the time of the trailing edge of the output voltage $V_{11}$.

The signal processing apparatus 100 is provided with a logic operating circuit 60 which on the basis of the leading and trailing edges of the output voltage $V_{11}$ produces a pulse signal having timing information, namely, timing information indicating the time when the transducer 3 moves relatively from a position opposite an S pole to a position opposite an N pole and timing information indicating the time when the transducer 3 moves relatively from a position opposite an N pole to a position opposite an S pole. The logic operating circuit 60 has gate circuits 61 and 62, an AND circuit 63, an inverter 64, an R-S flip-flop 65 of well-known disign, and a D flip-flop 66.

The gate circuit 61 is responsive to the output voltages $V_{11}$ and $V_{21}$ to produce a set signal SS whose level is low when both output voltages $V_{11}$ and $V_{21}$ are high level and is high in cases other than when both voltages $V_{11}$ and $V_{21}$ are high level (FIG. 4E). On the other hand, the gate circuit 62 is also responsive to the output voltages $V_{11}$ and $V_{21}$ to produce a reset signal RS whose level is low when both the output voltages $V_{11}$ and $V_{21}$ are low level and is high in the case other than when both voltages $V_{11}$ and $V_{12}$ are low level (FIG. 4F).

The R-S flip-flop 65 is reset in response to each trailing edge of the reset signal RS and is set in response to each trailing edge of the set signal SS. Consequently, as shown in FIG. 4G, the level of a Q output signal FS derived from the Q output terminal of the R-S flip-flop 65 changes from low to high at the time of each trailing edge of the set signal SS and changes from high to low at the time of each trailing edge of the reset signal RS. The Q output signal FS is applied to the D input terminal of the D flip-flop 66.

The AND circuit 63 has one input terminal to which the output voltage $V_{11}$ is input and another input terminal which receives an inverted voltage $IV_{21}$ obtained by inverting the level of the output voltage $V_{21}$ by use of an inverter 64 (FIG. 4H). The output signal of the AND circuit 63 is applied as a clock signal K to the clock input terminal CK of the D flip-flop 66.

As illustrated in FIG. 4I, the clock signal K is a pulse train signal, consisting of pulses of a relatively small width whose leading edges corresponds to the respective angular positions $T_1$, $T_2$, $T_3$, ... corresponding to the boundaries between adjacent N and S pole areas.

The D flip-flop 66 is responsive to the Q output signal FS and the clock signal K to latch the level of the Q output signal FS at each leading edge of the clock signal K, whereby a detection signal OS is output (FIG. 4J). As will be understood from FIG. 4J, the level of the detection signal OS is high when the transducer 3 is opposite an N pole and is low when the transducer 3 is opposite an S pole. As a result, it follows that the time of the level change of the detection signal OS corresponds to the time the transducer 3 comes opposite a boundary between an N pole and an S pole.

Description will be given to the operation of the signal processing apparatus 100 of FIG. 3 with reference to FIGS. 4A to 4J.

When the magnetic rotary disk 2 moves relatively with respect to the transducer 3, the amplified output signal S shown in FIG. 4B is produced from the amplifying circuit 9. In the case where the relative rotational position of the transducer 3 is, for example, B1, both the output voltages $V_{11}$ and $V_{21}$ are low level. Accordingly, the level at the non-inverting input terminal of the comparator 41 of the first level discriminating circuit 40 is Vr and that at the comparator 51 of the second level discriminating circuit 50 is $L_2$.

In this condition, when the magnetic rotary disk 2 rotates further and the relative rotational position of the transducer 3 exceeds $T_2$, the level of the output voltage $V_{11}$ changes from low to high since the level of the amplified output signal S falls below that of Vr. However, the output voltage $V_{21}$ does not change and is maintained at low level. The level of the output voltage $V_{21}$ becomes high when the level of the amplified output signal S falls below the level $L_2$ because the relative position of the transducer 3 goes past $B_2$ with the further rotation of the disk 2.

In the case where both the output voltage $V_{11}$ and $V_{21}$ are high level, the level $L_1$ is established at the non-inverting input terminal of the comparator 41 and the level Vr is established at the non-inverting input terminal of the comparator 51. Accordingly, while the level of the output voltage $V_{21}$ returns to low when the relative rotational position of the transducer 3 shown in FIG. 3 goes past $T_3$ and the level of the amplified output signal S becomes greater than Vr, the output voltage $V_{11}$ returns to low level when the relative rotational position goes past $B_3$ with still further rotation of the disk 2, and the level of the amplified output signal S becomes greater than $L_1$.

The levels of the output voltages $V_{11}$ and $V_{21}$ change in a similar way as the disk 2 rotates further. However, the level of the output voltage $V_{21}$ is always low when the level of the output voltage $V_{11}$ changes at $T_2$, $T_4$, ... . In contrast, the level of the output voltage $V_{11}$ is always high when the level of the output voltage $V_{21}$ changes at $T_1$, $T_3$, ... . The logic operating circuit 60 serves to discriminate whether or not the foregoing relationship in level between the output voltages $V_{11}$ and $V_{21}$ is satisfied, and the detection signal OS, whose level changes at $T_1$, $T_2$, $T_3$, .., is produced when the foregoing relationship is established.

As a result, the duty cycle of the detection signal OS depends only upon the width of the magnetic poles provided on the magnetic rotary disk 2, so that the duty cycle does not change even if the level of the amplified output signal S varies, whereby stable operation can be realized. Furthermore, even if the level of the amplified output signal S varies near the level of the reference voltage Vr due to, for example, the superposition of a noise signal, since the first and second level discriminating circuits 40 and 50 have hysteresis characteristics by which the reference level used for level discriminating operation changes depending upon the change in output level, chattering does not occur in the output voltages $V_{11}$ and $V_{12}$. Thus, stable operation can be realized.

In addition, in the case where the magnetic rotary disk 2 slightly vibrates within an angular range from $+\Delta\theta$ to $-\Delta\theta$ at the angular position $\theta o$ as center, if $\Delta\theta < (X_o - X_1)$ and $\Delta\theta < (T_2 - X_3)$ under the condition that $\theta o$ is equal to Xa, the vibration does not affect the signal processing operation.

If $\theta o = X_b$, the vibrating operation affects the signal processing operation only in the case where $\Delta\theta > (X_b - X_1)$ and $\Delta\theta > (X_2 - X_b)$.

What is claimed is:

1. A signal processing apparatus for processing an output signal of a rotation sensor having a rotary member with a magnetic pole or poles of one type and a magnetic pole or poles of the other type which are arranged alternately, and a transducing means for obtaining an electric signal whose level changes in accordance with a change in a magnetic field produced by a relative movement between said rotary member and said transducing means, said apparatus comprising:

a first circuit means for comparing the level of the output signal with that of a fixed reference signal to produce a first signal whose level changes at a detection time when a relative positional relationship between said transducing means and said rotary member changes from the condition where said transducing means faces the magnetic pole of one type to the condition where said transducing means faces the magnetic pole of the other type, said first circuit means comprising a first comparing means having an input port to which the output signal is applied and another input port to which the fixed reference signal is applied, the level of the fixed reference signal corresponding to the level of the output signal when said transducing means faces a boundary between the magnetic pole of one type and the magnetic pole of the other type;

a second circuit means for comparing the level of the output signal with that of a variable reference signal to produce a second signal whose level changes at a time different from the detection time, said second circuit means comprising a second comparing means having an input port to which the output signal is applied and another input port to which the variable reference signal is applied, the level of the variable reference signal changing in accordance with an output level of the second comparing means in such a way that the variable reference signal is at a first level higher than the level of the fixed reference signal for one output level state of the second comparing means and is at a second level lower than the level of the fixed reference signal for another output level state of the second comparing means; and, a logic circuit means for processing the first and second signals to output a detection pulse carrying information on the detection time, in which a level of the detection pulse changes in response to a change in the level of the first signal only in the case where the level of the second signal is in a prescribed state when the level of the first signal changes at the detection time.

2. An apparatus as claimed in claim 1, wherein said alternately arranged magnetic poles are adjacent to each other, and wherein an output level of the first comparing means changes between one level state and another level state at each time said transducing means goes beyond the boundary between adjacent magnetic poles.

3. An apparatus as claimed in claim 1, wherein the second circuit means includes a level shifting circuit means responsive to the second signal and the fixed reference signal for producing the variable reference signal.

4. An apparatus as claimed in claim 1, wherein said logic circuit means has means responsive to the first and second signals for producing a set signal whose level changes at the time of the level change of the first signal from one level state to another level state only in the case where the level of the second signal is in a state required for the level change of the first signal from one level state to another level state.

5. A signal processing apparatus for processing an output signal of a rotation sensor having a rotary member with a magnetic pole or poles of one type and a magnetic pole or poles of the other type which are arranged alternately, and a transducing means for obtaining an electric signal whose level changes in accordance with a change in a magnetic field produced by a relative movement between said rotary member and said transducing means, said apparatus comprising:

a first circuit means responsive to the output signal for producing a first signal whose level changes at a detection time when a relative positional relationship between said transducing means and said rotary member changes from the condition where said transducing means faces the magnetic pole of one type to the condition where said transducing means faces the magnetic pole of the other type;

a second circuit means responsive to the output signal for producing a second signal whose level changes at a time different from the detection time; and, a logic circuit means for changing a level of a detection pulse in response to a change in the level of the first signal only in the case where the level of the second signal is in a prescribed state when the level of the first signal changes at the detection time, said logic circuit means comprising means responsive to the first and second signals for producing a set signal whose level changes at the time of the level change of the first signal from one level state to another level state only in the case where the level of the second signal is in a state required for the level change of the first signal from one level state to another level state, means responsive to the first and second signals for producing a reset signal whose level changes at the time of the level change of the first signal from said another level state to said one level state only in the case where the level of the second signal is in a state required for the level change of the first signal from said another level state to said one level state, and a flip-flop means responsive to the set and reset signals for producing the detection pulse, said detection pulse carrying information on the detection time.

6. A signal processing apparatus for processing an output signal of a rotation sensor having a rotary member with a magnetic pole or poles of one type and a magnetic pole or poles of the other type which are arranged alternately, and a transducing means for obtaining an electric signal whose level changes in accordance with a change in a magnetic field produced by a relative movement between said rotary member and said transducing means, said apparatus comprising:

a first circuit means for comparing the level of the output signal with that of a first variable reference signal to produce a first signal whose level changes at a detection time when a relative positional relationship between said transducing means and said rotary member changes from the condition where said transducing means faces the magnetic pole of one type to the condition where said transducing means faces the magnetic pole of the other type, said first circuit means comprising a first comparing means having an input port to which the output signal is applied and another input port to which the first variable reference signal is applied, the level of the first variable reference signal changing in accordance with an output level of the first comparing means in such a way as to be a prescribed reference level corresponding to the level of the output signal when said transducing means faces a boundary between the magnetic pole of one type and the magnetic pole of the other type, for one output level state of the first comparing means, and to be a first level higher than the prescribed reference level for another output level state of the first comparing means;

a second circuit means for comparing the level of the output signal with that of a second variable reference signal to produce a second signal whose level changes at a time different from the detection time, said second circuit means comprising a second comparing means having an input port to which the output signal is applied and another input port to which the second variable reference signal is applied, the level of the second variable reference signal changing in accordance with an output level of the second comparing means in such a way as to be the prescribed reference level for said another output level state of the second comparing means, and to be a second level lower than the prescribed reference level for said one output level state of the second comparing means; and, a logic circuit means for processing the first and second signals to output a detection pulse carrying information on the detection time, in which a level of the detection pulse changes in response to a change in the level of the first signal only in the case where the level of the second signal is in a prescribed state when the level of the first signal changes at the detection time.

* * * * *